(12) United States Patent
Jiang et al.

(10) Patent No.: US 11,728,505 B2
(45) Date of Patent: Aug. 15, 2023

(54) BATTERY COVER PLATE ASSEMBLY COMPRISING A CURRENT INTERRUPT APPARATUS

(71) Applicant: BYD COMPANY LIMITED, Guangdong (CN)

(72) Inventors: Luxia Jiang, Shenzhen (CN); Han Cheng, Shenzhen (CN); Jiangtao Zhou, Shenzhen (CN); Keli Yang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 384 days.

(21) Appl. No.: 16/956,997

(22) PCT Filed: Dec. 19, 2018

(86) PCT No.: PCT/CN2018/122115
§ 371 (c)(1),
(2) Date: Jun. 22, 2020

(87) PCT Pub. No.: WO2019/120225
PCT Pub. Date: Jun. 27, 2019

(65) Prior Publication Data
US 2020/0343491 A1 Oct. 29, 2020

(30) Foreign Application Priority Data
Dec. 22, 2017 (CN) .......................... 201721829121.2

(51) Int. Cl.
*H01M 50/147* (2021.01)
*H01M 50/342* (2021.01)
(Continued)

(52) U.S. Cl.
CPC ..... *H01M 10/0413* (2013.01); *H01M 50/147* (2021.01); *H01M 50/15* (2021.01);
(Continued)

(58) Field of Classification Search
CPC ............. H01M 50/147; H01M 50/574; H01M 50/572; H01M 50/578; H01M 50/3425;
(Continued)

(56) References Cited

U.S. PATENT DOCUMENTS

| 5,747,187 A | 5/1998 | Byon |
| 2014/0087242 A1 | 3/2014 | Takashiro |

FOREIGN PATENT DOCUMENTS

| CN | 1217826 A | 5/1999 |
| CN | 1677708 A | 10/2005 |

(Continued)

OTHER PUBLICATIONS

EPO English translation of CN-205790089-U (Year: 2016).*
(Continued)

*Primary Examiner* — Christopher P Domone
*Assistant Examiner* — Kimberly Wyluda
(74) *Attorney, Agent, or Firm* — Calfee Halter & Griswold LLP

(57) ABSTRACT

A battery cover plate assembly, a cell, a battery module, a power battery, and an electric vehicle are provided. The battery cover plate assembly includes a cover plate, an inner lead-out member, and an outer electrode terminal. The inner lead-out member and the outer electrode terminal are electrically connected by using a current interrupt apparatus. A flipping member of the current interrupt apparatus is electrically connected to the outer electrode terminal. A score member is electrically connected to the inner lead-out member. A score is formed on the score member and is electrically connected to the flipping member. The inner lead-out member is mounted on the cover plate through a cover plate insulator. The cover plate insulator has a first engagement portion engaged with the cover plate and a second engagement portion engaged with the inner lead-out member.

12 Claims, 8 Drawing Sheets

(51) Int. Cl.
*H01M 50/578* (2021.01)
*H01M 50/176* (2021.01)
*H01M 50/536* (2021.01)
*H01M 10/04* (2006.01)
*H01M 50/574* (2021.01)
*H01M 50/15* (2021.01)

(52) U.S. Cl.
CPC ..... *H01M 50/176* (2021.01); *H01M 50/3425* (2021.01); *H01M 50/574* (2021.01); *H01M 50/578* (2021.01); *H01M 50/536* (2021.01); *H01M 2220/20* (2013.01)

(58) Field of Classification Search
CPC ........... H01M 50/536; H01M 40/0413; H01M 2220/20; H01M 10/0413
See application file for complete search history.

(56) References Cited

FOREIGN PATENT DOCUMENTS

| | | | |
|---|---|---|---|
| CN | 100375318 | C | 3/2008 |
| CN | 101170168 | A | 4/2008 |
| CN | 101188275 | A | 5/2008 |
| CN | 104641492 | A | 5/2015 |
| CN | 204348811 | U | 5/2015 |
| CN | 205666262 | U | 10/2016 |
| CN | 205790089 | U * | 12/2016 |
| CN | 205790098 | U | 12/2016 |
| CN | 107123775 | A | 9/2017 |
| CN | 107123776 | A | 9/2017 |
| CN | 207818641 | U | 9/2018 |
| CN | 207818642 | U | 9/2018 |
| CN | 207818643 | U | 9/2018 |
| CN | 207818749 | U | 9/2018 |
| EP | 2903056 | A1 | 8/2015 |
| EP | 2924761 | A1 | 9/2015 |
| JP | H06196140 | A * | 7/1994 ........ H01M 50/3425 |
| JP | 2015138672 | A | 7/2015 |
| KR | 20050095949 | A | 10/2005 |
| WO | 2014/080518 | A1 | 5/2014 |

OTHER PUBLICATIONS

EPO English translation of CN-205790098-U (Year: 2016).*
EPO English translation of CN-101170168-A (Year: 2008).*
EPO machine generated English translation of JPH06196140A (Year: 1994).*

* cited by examiner

BATTERY COVER PLATE ASSEMBLY COMPRISING A CURRENT INTERRUPT APPARATUS

CROSS-REFERENCE TO RELATED APPLICATIONS

This application is the National Stage of International Application No. PCT/CN2018/122115, filed on Dec. 19, 2018, which claims to the priority of Chinese Patent No "201721829121.2" filed by the BYD Co., Ltd. on Dec. 22, 2018 and entitled "BATTERY COVER PLATE ASSEMBLY, CELL, BATTERY MODULE, POWER BATTERY, AND ELECTRIC VEHICLE", which are incorporated by reference in the present application in their entireties.

FIELD

The present disclosure relates to the battery field, and relates to a battery cover plate assembly, a cell using the battery cover plate assembly, a battery module using the cell, a power battery using the battery module, and a vehicle using the power battery.

BACKGROUND

As an energy storage unit, a battery plays an important role in various industries. For example, power batteries are widely used in fields such as new energy vehicles, etc. A battery pack of the power battery may have a battery module consisting of a plurality of cells connected in series or in parallel to achieve charging and discharging. During charging and discharging of power batteries, a battery management system (BMS) usually monitors changes of a voltage and a current and calculates a charge status. If voltage sampling is erroneous, battery overcharging may be caused. This is especially true for a ternary system. Overcharging to a specific extent may result in a risk of battery explosion.

In the related art, a voltage and a current of a battery are monitored, and a battery level is calculated by using a current integration method and an open circuit voltage method, and battery charging and discharging are thereby controlled. However, there are also disadvantages, such as a battery voltage sampling failure or a current sampling failure or a software failure. As a result, long-term battery charging cannot be controlled, especially during charging by using a charging pile, when communication between the charging pile and a battery manager fails, overcharging cannot be controlled. Overcharging to a specific extent may cause the battery to swell or even explode and catch fire.

SUMMARY

The present disclosure is intended to provide a battery cover plate assembly, a cell using the battery cover plate assembly, a battery module using the cell, a power battery using the battery module, and a vehicle using the power battery.

In order to achieve the above objectives, the present disclosure provides a battery cover plate assembly, including a cover plate, an inner lead-out member located at an inner side of the cover plate, and an outer electrode terminal located at an outer side of the cover plate, the inner lead-out member and the outer electrode terminal being electrically connected by using a current interrupt apparatus. The current interrupt apparatus includes a score member and a flipping member, the flipping member being electrically connected to the outer electrode terminal, and the score member being electrically connected to the inner lead-out member. A score is formed on the score member and is electrically connected to the flipping member. The flipping member is capable of acting under an effect of air pressure to break the score. The inner lead-out member is mounted on the cover plate through a cover plate insulator. The cover plate insulator has a first engagement portion engaged with the cover plate and a second engagement portion engaged with the inner lead-out member.

In some embodiments, the first engagement portion and/or the second engagement portion form/forms an annular slot, and the inner lead-out member forms a sheet structure, the annular slot formed by the second engagement portion being configured to accommodate an outer periphery of the inner lead-out member.

In some embodiments, the cover plate insulator includes a substrate attached to a lower surface of the cover plate, and a mounting hole configured to mount the current interrupt apparatus is formed on the cover plate, the first engagement portion including a first annular protrusion connected to an upper surface of the substrate, the first annular protrusion having an L-shaped cross-section, so that the first engagement portion forms, with the substrate, an annular slot configured to accommodate a hole wall of the mounting hole through folding outward after passing through the mounting hole.

In some embodiments, the inner lead-out member forms a sheet structure, and the second engagement portion includes a second annular protrusion connected to a lower surface of the substrate, the second annular protrusion having an L-shaped cross-section, so that the second engagement portion forms, with the substrate, an annular slot configured to accommodate the outer periphery of the inner lead-out member.

In some embodiments, the sheet structure formed by the inner lead-out member has an intermediate welding region electrically connected to the score member and an edge welding region electrically connected to a core, the edge welding region being located at an outer side of the intermediate welding region to be engaged in the annular slot formed by the second engagement portion.

In some embodiments, the edge welding region has a thickness greater than or equal to a thickness of the intermediate welding region.

In some embodiments, the edge welding region forms an annular connection region surrounding the intermediate welding region or a strip-shaped welding region located on two sides of the intermediate welding region.

In some embodiments, the score member includes a score region on which the score is formed, a first welding region to be electrically connected to the flipping member, and a second welding region to be electrically connected to the inner lead-out member, the score region forming an elongated structure extending along a length direction of the cover plate, the score extending along a length direction of the elongated structure, and the first welding region and the second welding region being disposed on two sides of the score region along a height direction and respectively forming an elongated structure extending along the length direction of the cover plate, and the intermediate welding region correspondingly forms an elongated structure.

In some embodiments, an accommodating welding groove configured to accommodate the second welding region is formed on the intermediate welding region.

The present disclosure further provides a cell. The cell includes a housing, a core accommodated in the housing, and a battery cover plate assembly packaging the housing. The battery cover plate assembly is the battery cover plate assembly provided in the present disclosure, the inner lead-out member is electrically connected to the core, and the flipping member is in gas communication with inside of the housing.

The present disclosure further provides a battery module, the cell provided in the present disclosure being disposed inside the battery module.

The present disclosure further provides a power battery, including a pack body and a battery module disposed inside the pack body. The battery module is the battery module provided in the present disclosure.

The present disclosure further provides an electric vehicle, the power battery provided in the present disclosure being disposed in the electric vehicle.

According to the above technical solutions, the cover plate insulator may be stably mounted on the cover plate by using an engagement structure, so that a force transmitted from the core to the inner lead-out member can be directly transmitted to the cover plate during use of a battery, avoiding impact on the score member connected to the inner lead-out member during pole core vibration of the core, thereby avoiding unexpected break of the score.

Other features and advantages of the present disclosure will be described in detail in the following detailed description.

BRIEF DESCRIPTION OF THE DRAWINGS

The accompanying drawings are provided to further understand the present disclosure, and they constitute a part of the specification. The accompanying drawings, along with the detailed description below, are used to explain the present disclosure, and pose no limitation on the present disclosure. In the figures.

DETAILED DESCRIPTION

The following describes specific embodiments of the present disclosure in detail with reference to the accompanying drawings. It should be understood that the specific implementations described herein are merely used to describe and explain the present disclosure but are not intended to limit the present disclosure.

In the present disclosure, unless otherwise stated, directional terms such as "up, down, left, and right" used herein are generally defined based on drawing directions of corresponding drawings, and "inner and outer" refer to inside and outside of a contour of a corresponding component.

Figure 1:
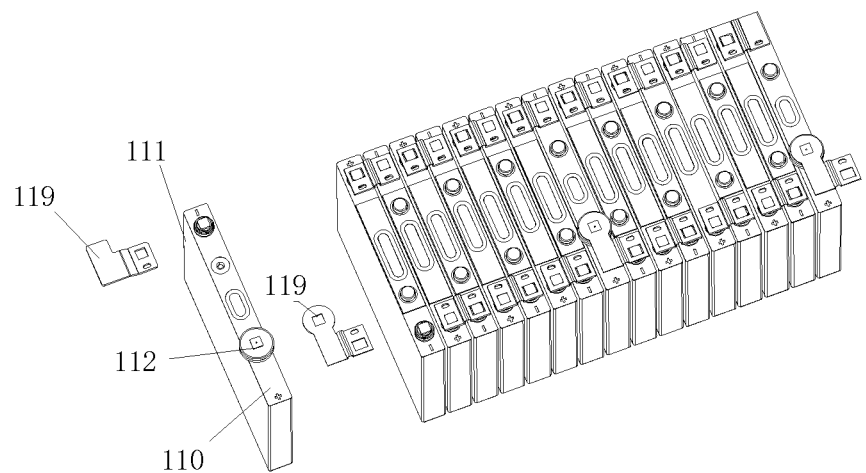
FIG. 1 is a partial three-dimensional schematic exploded view of a battery module according to the present disclosure.

As shown in FIG. 1 to FIG. 11, the present disclosure provides the following technical solutions: a cover plate assembly, a current interrupt apparatus in the battery cover plate assembly, a flipping member and a score member in the current interrupt apparatus, a cell using the battery cover plate assembly, a battery module using the cell, a power battery using the battery module, and a vehicle using the power battery. As shown in FIG. 1, the current interrupt apparatus is disposed between an outer electrode terminal 112 and an internal core for cutting off circuits inside and outside a battery. In a cell, a plurality of cells are connected in series or in parallel to form a battery module, and may be placed in a battery pack to form a power battery. In addition to the power battery field, the various technical solutions provided in the present disclosure may also be widely applied to other battery fields. In some embodiments of the present disclosure, the current interrupt apparatus is described by using two implementations. The implementations are described in detail below with reference to the drawings.

Figure 4:
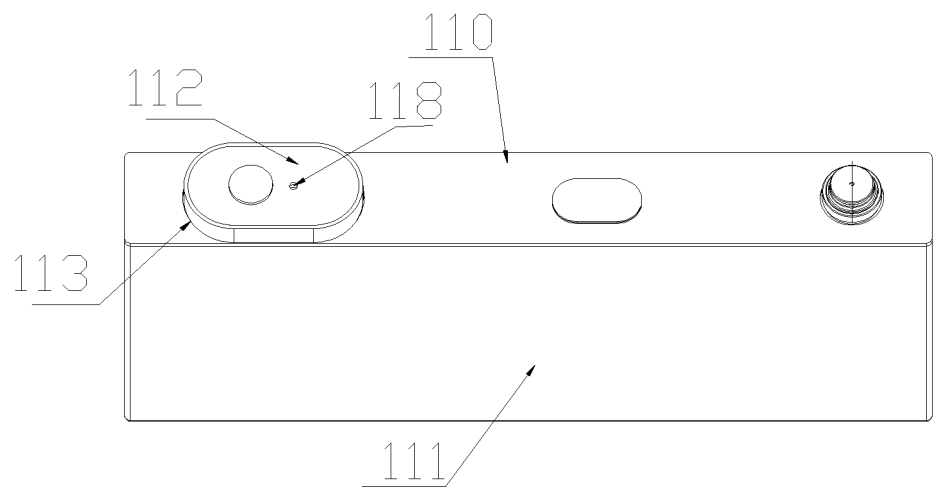
FIG. 4 is a three-dimensional schematic structural diagram of a cell of a battery cover plate assembly according to an implementation of the present disclosure.
Figure 8:
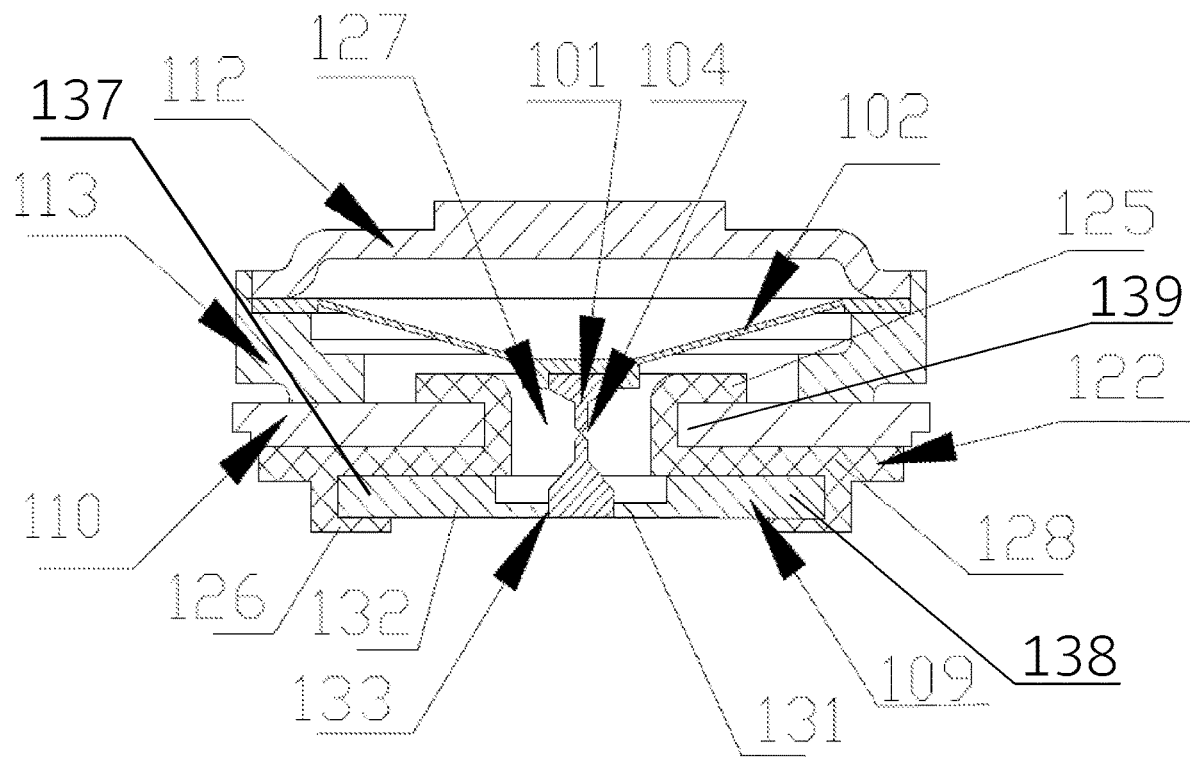
FIG. 8 is a cross-sectional view of a battery cover plate assembly based on the score member in FIG. 5 according to an implementation of the present disclosure.

First, as shown in FIG. 1 and FIG. 4, an implementation of the present disclosure provides a battery module, including a plurality of cells. The cell may include a housing 111, a core accommodated in the housing 111, and a cover plate 110 packaging the housing 111. The outer electrode terminal 112 is disposed on the cover plate for completing current input and output through various electrode lead-out members 119. As shown in FIG. 8, the battery cover plate assembly further has an inner lead-out member 109 electrically connected to the core. The current interrupt apparatus is disposed between the outer electrode terminal 112 and the inner lead-out member 109 to control current input and output of the electrode terminal. In other words, when the current interrupt apparatus is in a conventional state, the core is in a conducting state. In this case, the electrode terminal can normally input and output a current to complete charging and discharging of the cell. However, in a dangerous state, such as battery overcharging, the current interrupt apparatus can interrupt the current inputting of the electrode terminal, thereby avoiding battery overcharging, etc. Therefore, reliability of the current interrupt apparatus as an important safety measure is crucial, that is, the current interrupt apparatus needs to make a response quickly.

In the present disclosure, all current interrupt apparatuses in the various implementations are mechanical structures for sensing air pressure. In some embodiments, the current interrupt apparatus is in gas communication with inside of the housing of the cell and can interrupt a flowing current under an effect of the air pressure. In some embodiments, current transfer can be interrupted by disconnecting internal components, thereby cutting off battery charging and discharging in time. A source of the used air pressure is as follows. When the battery is in a dangerous state such as overcharging, gas is generated inside the battery, resulting in an increase of the air pressure inside the housing, or when a battery temperature rises due to an abnormality during use of the battery, the air pressure inside the battery increases, resulting in pneumatic power that drives the current interrupt apparatus.

For example, in the implementation of FIG. 8, the current interrupt apparatus has a score member 101 and a flipping member 102 electrically connected to the score member 101, and the electrical connection between the flipping member 102 and the score member 101 can be cut off under the effect of the air pressure. In the implementation of the present disclosure, at least one of the flipping member and the score member may be broken. For example, a weak score may be made on a corresponding component to break the structure, thereby cutting off the electrical connection. In some embodiments, a score 104 is formed on the score member 101. In other words, under the effect of the internal air pressure, the score 104 may be broken through a flipping action of the flipping member 102, so as to cut off the electrical connection between the inner lead-out member 109 and outer electrode terminal 112, thereby interrupting the current transfer.

A reason for adopting this method is that, for example, in the power battery field, a relatively large flowing current is required. Therefore, a welding structure between the score member 101 and the flipping member 102 needs to be stable to prevent the large current from fusing the welding structure. Therefore, by disposing the score 104 on the score member 101, that is, making a weak portion with strength less than that of other regions in the corresponding part, the score member 101 and the flipping member 102 can be completely disconnected.

Figure 2:
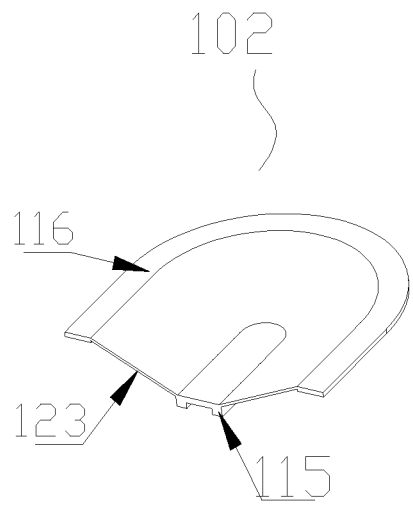
FIG. 2 is a partial three-dimensional schematic structural diagram of a flipping member of a current interrupt apparatus according to an implementation of the present disclosure.
Figure 3:
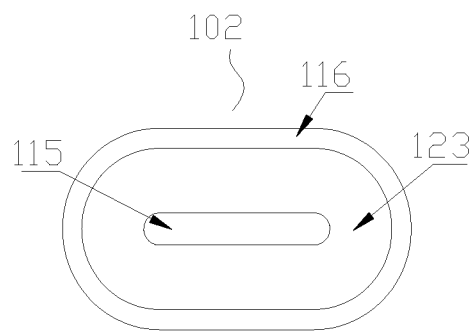
FIG. 3 is a top plan view of a flipping member of a current interrupt apparatus according to an implementation of the present disclosure.

In this implementation of the present disclosure, as shown in FIG. 2 and FIG. 3, the flipping member 102 is a sheet structure forming a cone, a smaller end of the cone forming a first connection region 115, and a larger end away from the score member 101 forming a second connection region 116. The cone structure may be configured to dispose the first connection region 115 and the second connection region 116 in different planes, and may provide a space for the flipping member 102 to flip upward under a force to break the score 104. In other possible implementations, the flipping member may also be an elastic flat member, etc.

Figure 9:
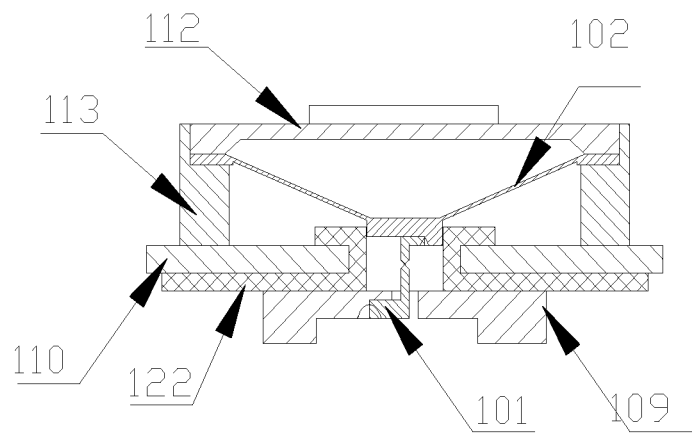
FIG. 9 is a cross-sectional view of a battery cover plate assembly based on the score member in FIG. 7 according to an implementation of the present disclosure.

As shown in FIG. 8 and FIG. 9, in the implementation of the present disclosure, in order to ensure that the flipping member can be acted by gas inside the battery, a support ring 113 is connected between a lower side of an outer periphery of the flipping member 102 and the cover plate 110 in a sealing manner, and an outer periphery of the outer electrode terminal 112 is electrically connected to an upper side of the outer periphery of the flipping member 102. In this way, the gas generated inside the battery can act on the flipping member 102 without leakage. In order to enable the flipping member 102 to act normally, as shown in FIG. 4, the outer electrode terminal 112 forms a cap structure and may have a through hole 118 for discharging gas during acting of the flipping member 102, thereby preventing the action of the flipping member 102 from being interfered under the effect of the air pressure. In addition, in two implementations in which the cover plate 110 is conductive and insulative, an insulating material or a conductive material may be selected for the support ring 113 for supporting. Generally, the support ring 113 may be a ceramic ring so that the cover plate 110 is insulative.

As shown in FIG. 2 and FIG. 3, the battery cover plate assembly provided in the implementation of the present disclosure includes a flipping member 102. The flipping member forms an elongated structure extending along a length direction of the cover plate 110 based on the above implementations. The elongated structure herein means that in a cross-section of the elongated structure parallel to the cover plate, a size along the cover plate is greater than sizes along other directions. Therefore, as shown in FIG. 4, since the flipping member 102 forms an elongated structure extending along the cover plate, not only an area of contact with internal gas can be ensured, but also a part of the current interrupt apparatus including the flipping member 102 from which the cover plate 110 is exposed in FIG. 1 can be less likely to extend out of the cover plate 110 along a height direction, for example, and can even completely fall within a range of the cover plate, which is shown in FIG. 9, thereby avoiding interference to other apparatuses other than the cover plate 110 while ensuring flipping sensitivity.

As shown in FIG. 2 to FIG. 4, in this implementation of the present disclosure, an end of the elongated structure along the length direction is arc-shaped, that is, a cross-section of the elongated structure parallel to the cover plate has a rectangle at a middle part and arc-shaped structures, so as to not only adapt to the structure of the cover plate 110, but also help form the annular flipping member and other corresponding structures, such as the score member 101, the support ring 113, and the outer electrode terminal 112 that cooperate with the flipping member. In other implementations, the elongated structure may also be a waist-shaped structure or an elliptic structure, and a long axis of the waist-shaped structure or an elliptic cross-section of the elliptic structure is a direction of the cover plate. In some implementations, the cross-section of the elongated structure parallel to the cover plate may also be other shapes such as a rectangular cross-section.

In this implementation of the present disclosure, since the outer electrode terminal 112 and the support ring 113 are connected to the flipping member 102 outside the cover plate 110, the outer electrode terminal and the support ring may be designed to elongated structures cooperating with each other. In this case, in order to connect the components, at least the second connection region 115 in the flipping member 102 connected to the outer electrode terminal 112 and the support ring 113 forms an elongated structure. Since the support ring 113 is connected to the cover plate 110, an elongated structure formed by the support ring may be designed to be within the edge of the cover plate 110, which is specifically a width edge of the cover plate 110. In some embodiments, a width edge of the support ring 113 is aligned with the edge of the cover plate 110. In this way, relatively large design space and stress space are obtained for the flipping member 102.

In this implementation, as shown in FIG. 2, the first connection region 116 also correspondingly forms an elongated structure extending along the cover plate. An end of the elongated structure along the length direction is arc-shaped, and the elongated structure may also be an elliptic structure or a waist-shaped structure. The corresponding score member 101 may form an elongated structure shown in FIG. 5 to FIG. 7.

In continuing description of the flipping member 102 in this implementation, the flipping member 102 is a sheet structure forming a cone along a direction perpendicular to an upper surface of the cover plate 110, a smaller end of the cone forming the first connection region 115 with an elongated structure, and a larger end away from the score member 110 forming the second connection region 116 parallel to the first connection region 115 with an elongated structure. In some embodiments, the second connection region 106 is a raised-edge structure to facilitate connection to both the support ring 113 and the outer electrode terminal 122.

In this implementation, in order to ensure connection strength, a thickness of the first connection region 115 and a thickness of the second connection region 116 are respectively greater than a thickness of an action region 123 between the first connection region and the second connection region. In some embodiments, the thickness of the first connection region and the thickness of the second connection region each may be 0.3-3 mm, and the thickness of the action region 123 may be 0.05-0.3 mm. The design is also applicable to the flipping member 102 in other implementations.

Figure 5:
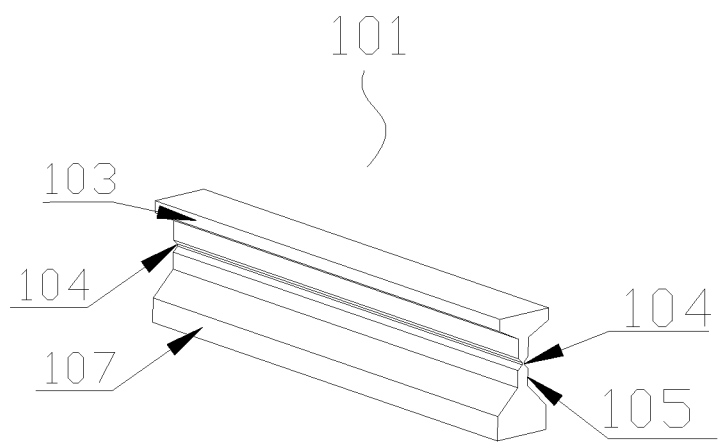
FIG. 5 is a three-dimensional schematic diagram of a first structure of a score member of a current interrupt apparatus according to an implementation of the present disclosure.
Figure 6:
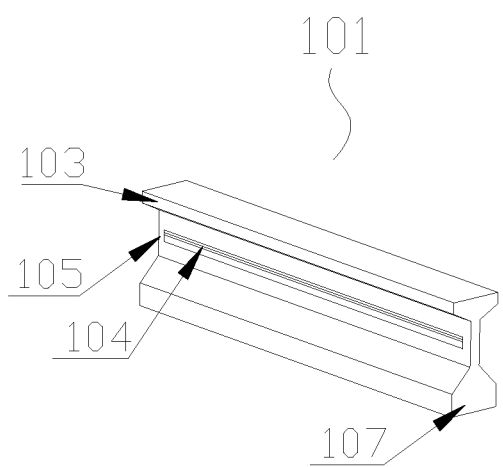
FIG. 6 is a three-dimensional schematic diagram of a second structure of a score member of a current interrupt apparatus according to an implementation of the present disclosure.
Figure 7:
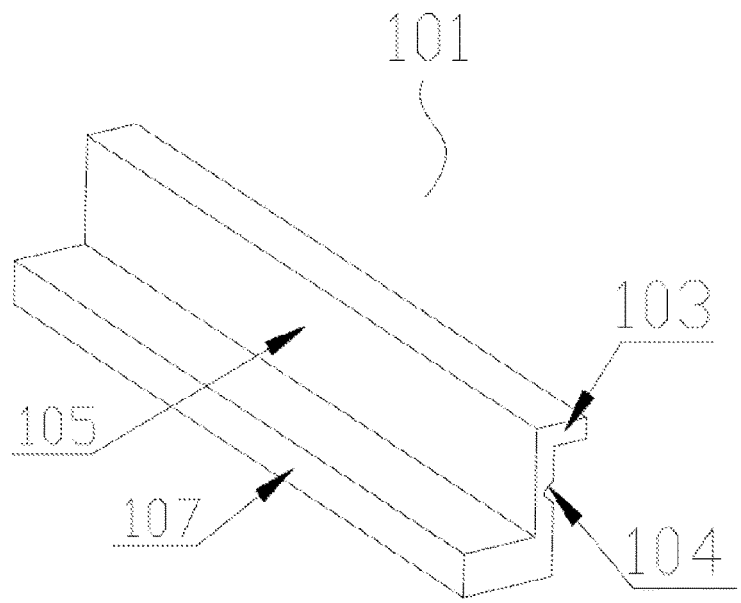
FIG. 7 is a three-dimensional schematic diagram of a third structure of a score member of a current interrupt apparatus according to an implementation of the present disclosure.

As shown in FIG. 5 to FIG. 7, based on the battery cover plate assembly provided in the implementations of the present disclosure, the three score members provided in the present disclosure are still described. Different from an existing score member in which the score forms a ring structure, in the score member 101 provided in this implementation, the score 104 is a non-closed-loop elongated score. In some embodiments, on a vertical cross-section of the score member 101 perpendicular to the length direction of the cover plate 110, the first welding region 103, the score region 105, and the second welding region 107 are sequentially disposed in a strip shape, and the score 104 extends along the length direction of the cover plate 110 on the score region 105. In this way, the electrical connection between the first welding region 103 and the second welding region 107 can also be cut off by breaking the score 104, so as to interrupt the current. In addition, strip-shaped arrangement is used in the vertical direction, that is, a size of the score member in a height direction is greater than a size of the score member in a width direction. In this way, the size of the score member 101 in the width direction can be effectively reduced, helping prevent the entire current interrupt apparatus from extending out of a range of the cover plate 110 in the width direction.

In addition, in this implementation, the score region 105 forms an elongated structure extending along the length direction of the cover plate, that is, the size of the score member in the length direction is greater than sizes of the score member in the width direction and the height direction. The score 104 extends along the length direction of the elongated structure to form a non-closed-loop score. In some embodiments, the score 104 is a linear score. In other possible implementations, the score may also be an elongated score such as a curve or zigzag score. In addition, in order to break the score 104, the first welding region 103 and the second welding region 107 are disposed on two sides of the score region 105 in the height direction. In other words, in an orientation shown in the figure, the first welding region 103, the score region 105, and the second welding region 107 are sequentially arranged from the top to the bottom along the height direction, so as to be linearly distributed in a vertical cross-section of the score member 101 perpendicular to the cover plate 110. Therefore, the score member is different from the existing annular score member with radial distribution. In this case, after the flipping member 102 flips under a force, the score 104 can also be broken, so that the current is interrupted.

As shown in FIG. 5 and FIG. 6, in an embodiment, the first welding region 103, the score region, and the second welding region sequentially form an I-shaped structure along the height direction, that is, two sides of the two welding regions both protrude from the score region 105 and may respectively form a welding joint of other components. In this way, welding to the flipping member and the inner electrode terminal is more stable, avoiding unexpected disconnection of the welding joint under an effect of an external force. The height direction of the score member 101 is relative to the length direction of the score member. After the score member is assembled to the cover plate, the height direction of the score member is relative to a vertical direction of the cover plate. In another embodiment, the first welding region 103, the score region 105, and the second welding region 107 sequentially form a Z-shaped structure along the height direction. In other words, only one side of each of the two welding regions protrudes from the score region 105 and can form a single welding joint. Therefore, when an external force is received, a corner of the Z-shaped structure can have a cushioning effect, protecting the score 104 on the score region 105 between the two welding regions, thereby reducing a possibility that the score 104 breaks unexpectedly.

In addition, regardless of the I shape or the Z shape, in this implementation, the score 104 and the two welding regions are disposed in different planes in the height direction or in other directions, thereby reducing impact of heat such as laser welding on the score.

In order to adapt to the elongated score member 101, as shown in FIG. 2, the flipping member 102 therein is forms an elongated structure extending along the cover plate, and is disposed in parallel to the score member 101 with the elongated structure. The first connection region 115 of the flipping member 102 extends along and is welded to the first welding region 103. The first connection region forms an elongated structure and a welding groove 124 configured to accommodate the first welding region 103 is formed on a lower surface. The welding groove 124 may be an n-shaped groove with an n-shaped cross-section or an L-shaped groove with an L-shaped cross-section.

In some embodiments, as shown in FIG. 2 and FIG. 7, when the score member 101 is an I-shaped structure, the welding groove 124 is an n-shaped groove, so as to be welded to two side edges of the first welding region 103 accommodated in the welding groove. For example, the welding groove is welded to the two sides through brazing or seam welding, so that an electrical connection between the two is stable.

In addition, as shown in FIG. 9, when the score member 101 is a Z-shaped structure, the welding groove 124 may be an L-shaped structure, so as to be welded to side edges of the first welding region accommodated in the welding groove away from the second welding region. For example, the welding groove is welded to the two sides through brazing or seam welding. In this way, when an external force is received, a corner of the Z-shaped structure performs cushioning for the score region 105.

In this implementation, regardless of the I-shaped or Z-shaped structure or a half-I-shaped and half-Z-shaped structure, the score 104 may be disposed in parallel to the first welding region 103 and the second welding region 107, respectively, so that when the flipping member flips 102, a maximum vertical tearing force can be applied to each part of the score 104 without generation of forces in other directions, thereby providing sensitivity of the current interrupt apparatus.

In this implementation, as shown in FIG. 5 or FIG. 6, an end of the score 104 may penetrate the score region 105 to an edge or may be spaced apart from the edge of the score region 105. Penetrating to the score region 105 can improve the sensitivity of the current interrupt apparatus, and spacing apart can ensure that the score 104 of the score member 101 is not affected when internal air pressure of the battery fluctuates within a low range but broken only when the internal pressure exceeds a predetermined value.

As shown in FIG. 6, when there is an interval between the end of the score 105 and the edge of the score region 105, especially when there is an interval between both of the two ends and the edge, the interval between the end of the score 104 and the edge of the score region 105 may be designed to 0.01-1 mm. In some embodiments, the interval between the end of the score 104 and the edge of the score region 105 is 0.05-0.5 mm. Therefore, not only the sensitivity of the current interrupt apparatus can be ensured, but also it is ensured that the score is not broken under impact of an external force or internal air pressure.

In two embodiments of the I shape and the Z-shape in this implementation, the thickness of the first welding region 103 and the thickness of the second welding region 107 are respectively greater than or equal to the thickness of the score region 105. It should be noted herein that, since the score region 105 forms a plate structure, a thickness direction of the score region is inconsistent with thickness directions of the two welding regions. The thickness directions of the two welding regions are upward and downward directions in the figure, that is, are welded to side edges of the welding groove, which may be understood as a direction perpendicular to the cover plate 110. A thickness direction of the score region 102 is parallel to the cover plate 110, that is, a width direction of the entire score member. In this case, the score 104 is formed on a side of the score region 105 extending upward and downward.

In some embodiments, the thickness of the first welding region 103 and the thickness of the second welding region 107 are 0.4-5 mm, and the thickness of the score region 105 is 0.05-1 mm. In some embodiments, the thickness of the first welding region 103 and the thickness of the second welding region 107 are 0.8-3 mm, and the thickness of the score region 105 is 0.1-0.8 mm. Therefore, setting the thickness of the score region 105 to be less than or equal to the thicknesses of the two welding regions can not only ensure welding strength of the welding region but also provide a basis for high-quality score processing.

In addition, the thickness of the first welding region 103 may also be designed to be equal to or less than the thickness of the second welding region 107. Therefore, not only the welding strength is ensured, but also excessive occupation of space for assembling the flipping member 102 can be avoided, so that the flipping member 102 may be designed to be as thick as possible in the height direction to flip in a relatively large range to break the score 104.

In this implementation, as shown in FIG. 6 and FIG. 7, one score 104 may be formed on one side of the score region 105, or as shown in FIG. 5, two scores may be formed at two sides of the score region 105. When there are two scores 104, the two scores are aligned at the two sides of the score region 105 to improve the sensitivity of the current interrupt apparatus.

In this implementation, as shown in FIG. 8 and FIG. 9, the flipping member has a second connection region 116 forming an elongated structure. A support ring 113 is connected between a lower side of the second connection region 116 and the cover plate 110 in a sealing manner, and an outer periphery of the outer electrode terminal 112 is electrically connected to an upper side of the second connection region 116. In this way, the support ring may form an elongated structure extending along the cover plate. In addition, in some embodiments, as shown in FIG. 9, the support ring may be designed to be within a width edge of the cover plate, so as to avoid impact other devices other than the battery.

Figure 10:
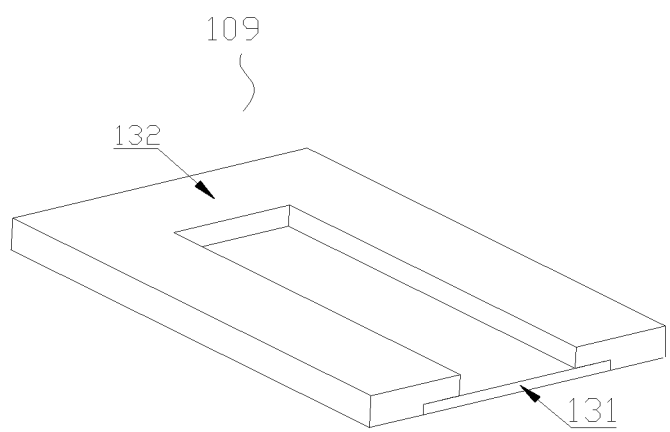
FIG. 10 is a partial schematic structural diagram of an inner lead-out member according to an implementation of the present disclosure.
Figure 11:
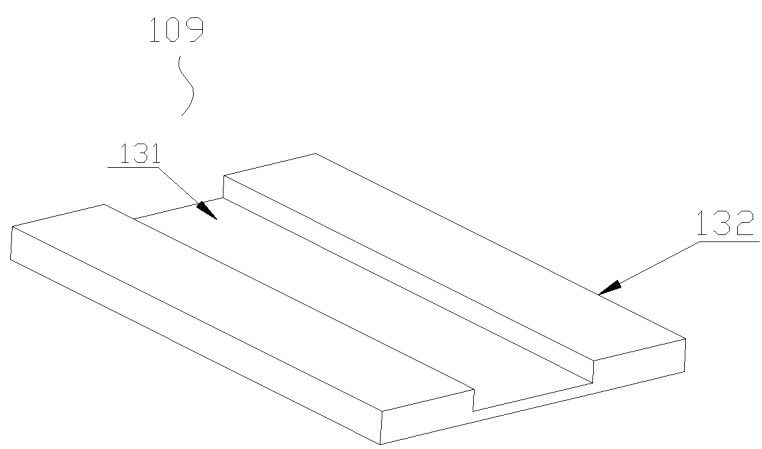
FIG. 11 is a partial schematic structural diagram of another inner lead-out member according to an implementation of the present disclosure.

In order to adapt to assembling of the elongated score member 101, as shown in FIG. 8, FIG. 10, and FIG. 11, in the battery cover plate assembly provided in this implementation of the present disclosure, the inner lead-out member 109 forms a sheet structure, the sheet structure having an intermediate welding region 131 electrically connected to the score member 101 and an edge welding region 132 electrically connected to a core, the edge welding region 132 being located at an outer side of the intermediate welding region 131. The edge welding region 132 has a thickness greater than or equal to a thickness of the intermediate welding region 131. When the thickness of the intermediate welding region 131 is relatively small, the intermediate welding region may form a step structure with the edge welding region 132 and have a height difference, that is, as shown in FIG. 8, the two are not in the same plane in a vertical direction. In this way, during welding of the edge welding region to a lug of the core or other adapters between the edge welding region and the core, a cushioning effect may be provided for the score member 101 connected to the intermediate welding region.

In some embodiments, in order to ensure structural strength and a cushioning effect, the thickness of the intermediate welding region 131 is 0.1-1 mm, and the thickness of the edge welding region 132 is 1-5 mm. In addition, in terms of structure, as shown in FIG. 10, the edge welding region 132 forms an annular connection region surrounding the intermediate welding region 131. The figure is a partial diagram. The annular edge welding region 132 can surround the intermediate welding region 131. In addition, as shown in FIG. 11, the edge welding region may also be a strip-shaped welding region located at two sides of the intermediate welding region 131. In other words, the intermediate welding region 131 is not closed, so that two ends of the intermediate welding region have openings. Such deformations fall within the protection scope of the present disclosure. In addition, the intermediate welding region 131 and the edge welding region 132 may be integrally formed, so that a number of components requiring welding is reduced, and assembling is simpler. In some implementations, the two may also be independent bodies to be connected, for example, connected through welding, so that a cushioning effect for the intermediate welding region can be enhanced.

Further, as shown in FIG. 8, an accommodating welding groove 133 configured to accommodate the second welding region 107 of the score member 101 may be formed on the intermediate welding region of the inner lead-out member 109. The accommodating welding groove extends along the second welding region 107 forming an elongated structure, to form an elongated structure, and may penetrate the intermediate welding region in an up-down direction, or may be a through hole structure, or may not penetrate the intermediate welding region, and is welded to the second welding region 107 through seam welding (brazing, etc.).

In this implementation, the score region 105 of the score member 101 forms an elongated structure extending along the length direction of the cover plate 110, the score 104 extending along a length direction of the elongated structure, and the first welding region 103 and the second welding region 107 being disposed on two sides of the score region 105 along a height direction and respectively forming an elongated structure extending along the length direction of the cover plate. The intermediate welding region 131 correspondingly forms an elongated structure. In addition, an accommodating groove 133 configured to accommodate the second welding region 107 is formed on the intermediate welding region 131.

Further, as shown in FIG. 12 to FIG. 19, various cover plate insulators 122 in the present disclosure are still described in detail. The inner lead-out member 109 is mounted on the cover plate 110 through the cover plate insulator 122. The cover plate insulator 122 has a first engagement portion 125 engaged with the cover plate 110 and a second engagement portion 126 engaged with the inner lead-out member 109. In other words, the cover plate insulator 122 may be stably mounted on the cover plate 110 by using an engagement structure, so that a force transmitted from the core to the inner lead-out member 109 can be directly transmitted to the cover plate 110 during use of a battery, avoiding impact on the score member 101 connected to the inner lead-out member 109 during pole core vibration of the core, thereby avoiding unexpected break of the score 104.

Figure 12:
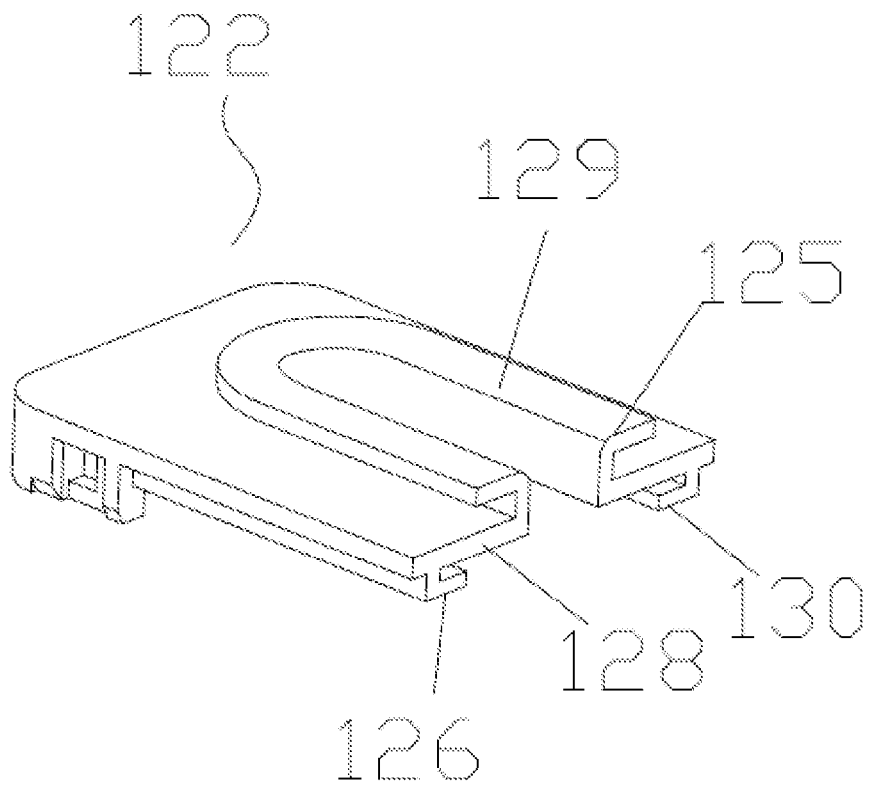
FIG. 12 is a three-dimensional schematic structural diagram of a first cover plate insulator according to an implementation of the present disclosure.
Figure 13:
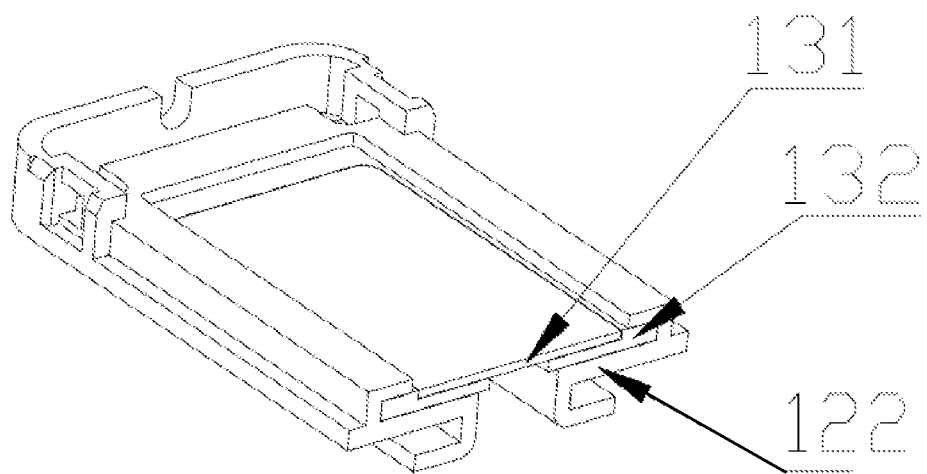
FIG. 13 is a three-dimensional schematic structural diagram of the cover plate insulator in FIG. 12 from another perspective.

As shown in FIG. 8, FIG. 12, and FIG. 13, in a first cover plate insulator 122, the first engagement portion 125 and the second engagement portion 126 respectively form an annular slot. In other implementations, only the first engagement portion 125 or the second engagement portion 126 forms an annular slot. In this implementation, the two engagement portions both form an annular slot. The annular slots have openings in opposite directions.

In some embodiments, the cover plate insulator 122 includes a substrate 128 attached to a lower surface of the cover plate 110. As shown in FIG. 8, a mounting hole 127 configured to mount the current interrupt apparatus (the score member or the flipping member) is formed on the cover plate 110. As shown in FIG. 12 and FIG. 13, the first engagement portion 125 includes a first annular protrusion 129 connected to an upper surface of the substrate 128, the first annular protrusion having an L-shaped cross-section, so that the first engagement portion forms, with the substrate 128, a first annular slot 137 configured to accommodate a hole wall of the mounting hole 127 through folding outward after passing through the mounting hole. In other words, an opening of the first annular slot 137 is located at an outer side in a radial direction, so that the hole wall of the mounting hole 127 is inserted and then wrapped, implementing stable engagement of the cover plate 110 and the cover plate insulator 122.

Different from the first engagement portion 125, as described above, since the inner lead-out member 109 may form a sheet structure, the first annular slot 137 formed by the second engagement portion 126 is configured to accommodate an outer periphery of the inner lead-out member 109, that is, an opening of the first annular slot 138 is located at an inner side in the radial direction, so that the outer periphery of the inner lead-out member 109 can be inserted to be wrapped and the inner lead-out member 109 is more stably mounted. In some embodiments, the second engagement portion 126 includes a second annular protrusion 130 connected to the lower surface of the substrate 128. The second annular protrusion has an L-shaped cross-section to have an opening located at the inner side in the radial direction, so as to form, with the substrate 128, a second annular slot 139 configured to accommodate the outer periphery of the inner lead-out member. In some embodiments, the edge welding region 132 of the inner lead-out member 109 forming a sheet structure is located at an outer side of intermediate welding region 131 to be engaged in the first annular slot 137 formed by the second engagement portion 126. In this way, the cover plate insulator 122 and the inner lead-out member 109 are stably engaged.

Figure 14:
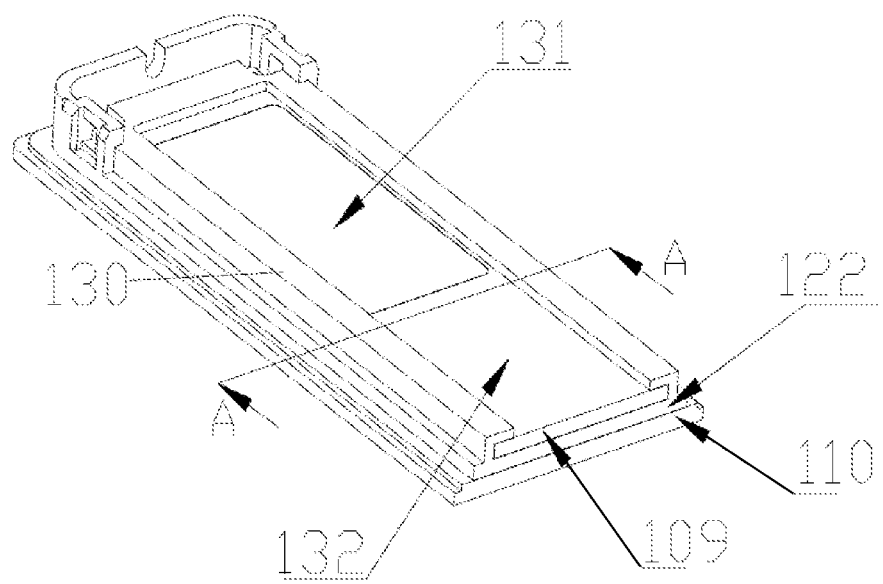
FIG. 14 is a three-dimensional schematic structural diagram of a second cover plate insulator according to an implementation of the present disclosure.
Figure 15:
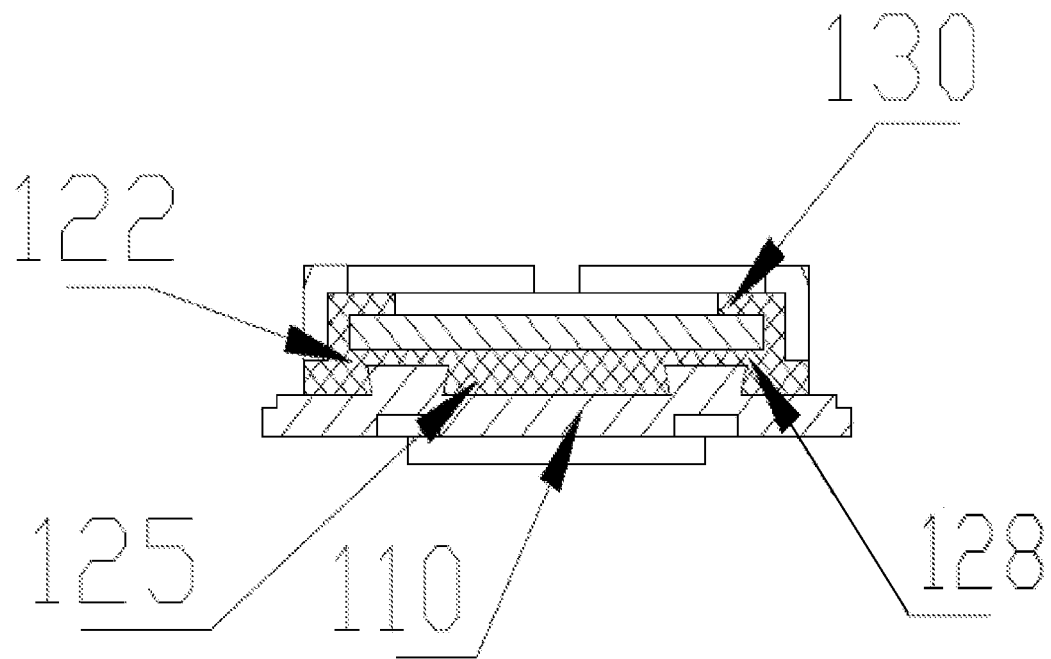
FIG. 15 is a schematic cross-sectional structural view taken along a line A-A' in FIG. 14.

As shown in FIG. 14 and FIG. 15, a second cover plate insulator 122 has a first engagement portion 125 engaged with the cover plate 110. Different from the first cover plate insulator, the first engagement portion 125 in this embodiment includes a first inverted tapered protrusion and/or a first inverted tapered groove. On the cover plate 110, a second inverted tapered groove matching the first inverted tapered protrusion in shape and accommodating the first inverted tapered protrusion and/or a second inverted tapered protrusion fitting the first inverted tapered groove in shape and embedded into first inverted tapered groove are/is correspondingly formed, so that the cover plate insulator 122 and the cover plate 110 are engaged through shape matching of the inverted tapered protrusion and the inverted tapered groove. In this engagement manner, the cover plate insulator 122 and the cover plate 110 are in a surface-to-surface connection without protrusion of other structures, saving more space, especially facilitating arrangement of the current interrupt apparatus.

In this embodiment, the first engagement portion 125 includes a plurality of first inverted tapered grooves, for example, two first inverted tapered grooves. A plurality of second inverted tapered protrusions matching the first inverted tapered grooves are disposed on the cover plate 110.

In another implementation, the first engagement portion 125 includes a plurality of first inverted tapered protrusions. Correspondingly, a plurality of second inverted tapered grooves matching the first inverted tapered protrusions are disposed on the cover plate 110.

In another implementation, the first engagement portion 125 includes a plurality of first inverted tapered grooves, for example, two first inverted tapered grooves. The plurality of first inverted tapered grooves extend in parallel to each other and one first inverted tapered protrusion is formed between adjacent first inverted tapered grooves. Correspondingly, a plurality of second inverted tapered protrusions are disposed on the cover plate. For example, one second inverted tapered groove is formed between two adjacent second inverted tapered protrusions, that is, one first inverted tapered protrusion of the cover plate insulator 122 is embedded into one second inverted tapered groove on the cover plate 110, and two second inverted tapered protrusions on the cover plate 110 are embedded into two first inverted tapered grooves on the cover plate insulator 122, so that the cover plate 110 and the cover plate insulator 122 are stably connected through interlocking engagement between the grooves and the protrusions.

In this embodiment, like the second engagement portion of the first cover plate insulator, a second engagement portion 126 at which the cover plate insulator 126 is engaged with the inner lead-out member 109 forms an annular slot with an opening located at the inner side in the radial direction, so as to accommodate the outer periphery of the inner lead-out member 109 forming the sheet structure. In some embodiments, the substrate 128 of the cover plate insulator 122 is attached to the lower surface of the cover plate 110, and the second annular protrusion 130 of the second engagement portion 126 connected to the lower surface of the substrate 128 has an L-shaped cross-section, to form, with the substrate 128, an annular slot configured to accommodate the outer periphery of the inner lead-out member. The edge welding region 132 of the inner lead-out member 109 is located at an outer side of the intermediate welding region 131 to be engaged in the annular slot formed by the second engagement portion 126.

Figure 16:
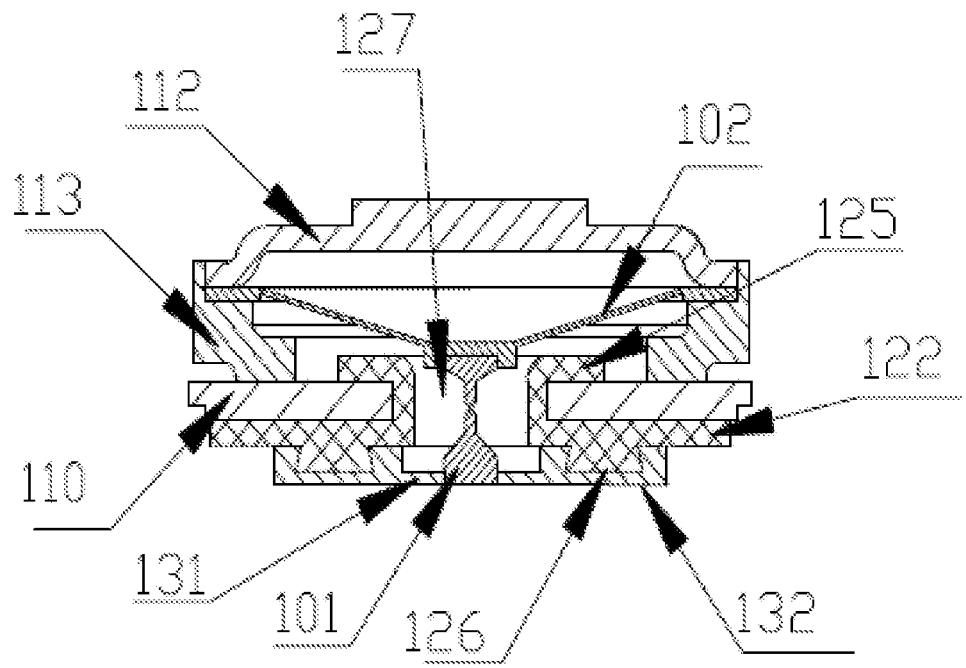
FIG. 16 is a cross-sectional view of the batter cover plate assembly in FIG. 8 whose cover plate insulator is replaced with a third cover plate insulator in this implementation.

As shown in FIG. 16, a third cover plate insulator 122 has a second engagement portion 126 engaged with the inner lead-out member 109. The second engagement portion 126 includes a first inverted tapered protrusion and/or a first inverted tapered groove. On the inner lead-out member 109, a second inverted tapered groove matching the first inverted tapered protrusion in shape and accommodating the first inverted tapered protrusion and/or a second inverted tapered protrusion fitting the first inverted tapered groove in shape and embedded into first inverted tapered groove are/is correspondingly formed. In other words, in this embodiment, the cover plate insulator 122 and the inner lead-out member 109 are engaged through shape matching of the inverted tapered protrusion and the inverted tapered groove. In this engagement manner, the cover plate insulator 122 and the inner lead-out member 109 are in a surface-to-surface connection without protrusion of other structures, saving more space, especially facilitating arrangement of the current interrupt apparatus.

The second engagement portion 126 includes a plurality of first inverted tapered protrusions, for example, two first inverted tapered protrusions. Correspondingly, a plurality of second inverted tapered grooves matching the first inverted tapered protrusions are disposed on the inner lead-out member 109.

Alternatively, the second engagement portion 126 includes a plurality of first inverted tapered grooves. Correspondingly, a plurality of second inverted tapered protrusions matching the first inverted tapered grooves are disposed on the inner lead-out member 109.

Alternatively, the second engagement portion 126 includes a plurality of first inverted tapered protrusions, for example, two first inverted tapered protrusions. The plurality of first inverted tapered protrusions extend in parallel to each other and one first inverted tapered groove is formed between adjacent first inverted tapered protrusions. Correspondingly, a plurality of second inverted tapered grooves, for example, two second inverted tapered grooves are disposed on the inner lead-out member 109, and one second inverted tapered protrusion is formed between two adjacent second inverted tapered grooves. In other words, as shown in FIG. 16, two first inverted tapered protrusions of the cover plate insulator 122 are embedded into two second inverted tapered grooves on the inner lead-out member 109, and one second inverted tapered protrusion on the inner lead-out member 109 is embedded into one first inverted tapered groove on the cover plate insulator 122, so that the inner lead-out member 109 and the cover plate insulator 122 are stably connected through interlocking engagement between the grooves and the protrusions.

A second inverted tapered protrusion and/or a second inverted tapered groove engaged with the second engagement portion 126 are/is formed on the edge welding region 132 of the inner lead-out member 109 forming the sheet structure. In other words, in this embodiment, as shown in FIG. 16, the above two second inverted tapered grooves are formed on the edge welding region 132 on two sides of the intermediate welding region 131.

In this embodiment, like the first engagement portion 125 of the first cover plate insulator, a first engagement portion 125 at which the cover plate insulator 126 is engaged with the cover plate 110 forms an annular slot with an opening located at the outer side in the radial direction. In some embodiments, the cover plate insulator 122 in this embodiment includes a substrate 128 attached to a lower surface of the cover plate 110, and a mounting hole 127 configured to mount the current interrupt apparatus is formed on the cover plate 110, the first engagement portion 125 including a first annular protrusion 129 connected to an upper surface of the substrate 128, the first annular protrusion having an L-shaped cross-section, so that the first engagement portion forms, with the substrate 128, an annular slot configured to accommodate a hole wall of the mounting hole 127 through folding outward after passing through the mounting hole.

Figure 17:
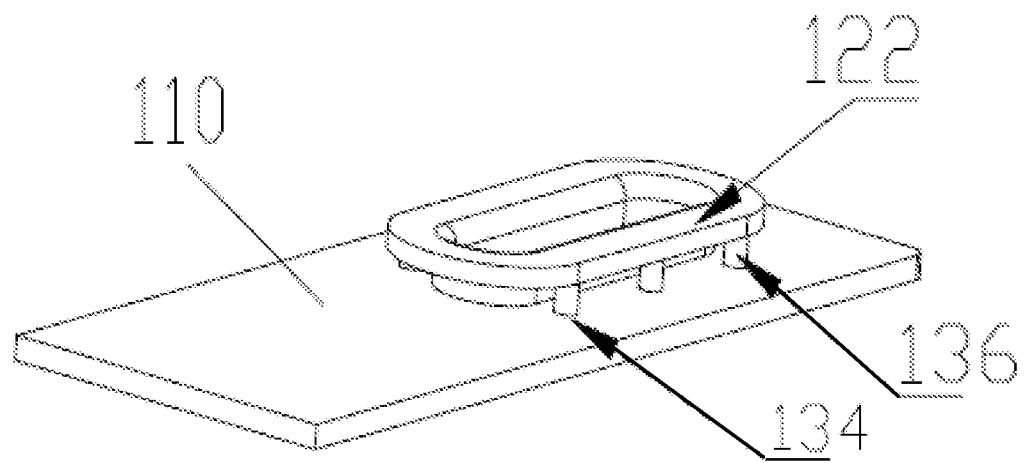
FIG. 17 is a three-dimensional schematic structural diagram of a fourth cover plate insulator mounted on a cover plate according to an implementation of the present disclosure.
Figure 18:
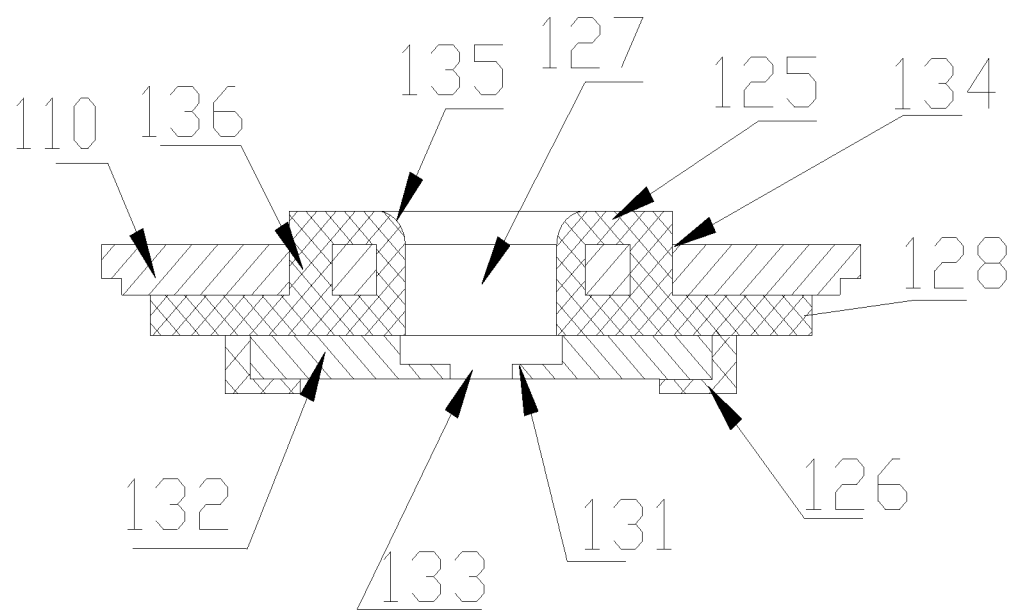
FIG. 18 is a schematic cross-sectional structural view of the cover plate insulator in FIG. 17 mounted on a cover plate.
Figure 19:
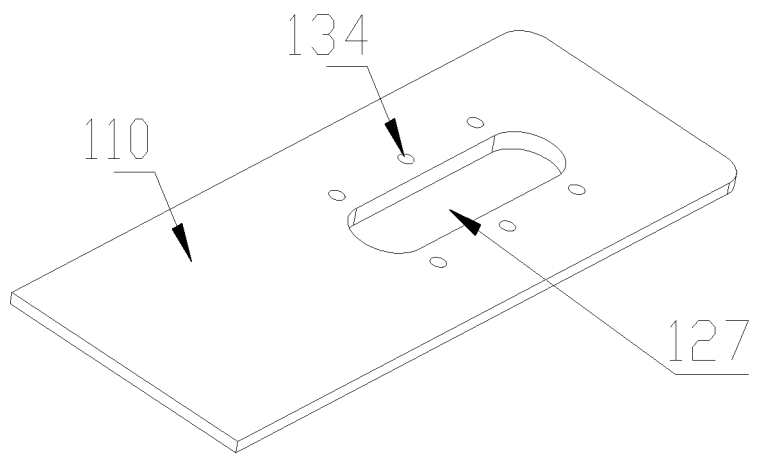
FIG. 19 is a partial schematic structural diagram of the cover plate in FIG. 17.

As shown in FIG. 17 to FIG. 19, a fourth cover plate insulator 122 has a first engagement portion 125 engaged with the cover plate 110, and a mounting hole 127 configured to mount a current interrupt apparatus and a plurality of engagement holes 134 surrounding the mounting hole 127 are formed on the cover plate 110. The cover plate insulator 122 includes a substrate 128 attached to the lower surface of the cover plate 110. The first engagement portion 125 includes a ferrule structure that extends upward from the upper surface of the substrate 128 through the mounting hole 127 and then folds outward and penetrates downward through the engagement hole and the substrate 128, thereby stably engaging the cover plate 110 with the cover plate insulator 122 through the closed ferrule structure.

In some embodiments, the closed ferrule structure includes an annular protrusion 135 and a plurality of connecting posts 136 spaced apart along a periphery of the annular protrusion. The annular protrusion 135 has an L-shaped cross-section, so that after passing through the mounting hole, the connecting post folds outward. The connecting post 136 passes through the engagement hole 134 and is connected between the annular protrusion 135 and the substrate 128, so that the annular protrusion 135, the connecting posts 136, and the substrate 128 constitute respective ferrule structures. The plurality of connecting posts 136 may be evenly distributed to ensure strength of the ferrule structure, which is shown in FIG. 17. In some embodiments, the mounting hole 127 and the annular protrusion 135 respectively form an elongated structure extending along the length direction of the cover plate 110. The same number of the connecting posts 136 are located on two sides of the mounting hole 127 in a width direction and are disposed at equal intervals. In some embodiments, intervals between the connecting posts on the two sides are the same, that is, the connecting posts 136 on the two sides are aligned one by one in the width direction, so that the strength of the ferrule structure is stable and vibration transmitted from the core to the inner lead-out member 109 can be effectively transmitted to the cover plate 110 through the edge welding region 132, thereby reducing a possibility that the score member 101 connected to the intermediate welding region 131 is affected.

As shown in FIG. 18, in this embodiment, like the second engagement portion of the first cover plate insulator, a second engagement portion 126 at which the cover plate insulator 126 is engaged with the inner lead-out member 109 forms an annular slot with an opening located at the inner side in the radial direction. The inner lead-out member 109 forms a sheet structure, and the annular slot is configured to accommodate the outer periphery of the inner lead-out member 109. The second annular protrusion 130 on the lower surface of the substrate 128 attached to the lower surface of the cover plate 110 on the cover plate insulator 122 has an L-shaped cross-section to form, with the substrate 128, an annular groove for accommodating the outer periphery of the inner lead-out member. An edge welding region 132 of the inner lead-out member 109 forming a sheet structure is located at an outer side of the intermediate welding region 131 to be engaged in the annular slot formed by the second engagement portion.

A battery cover plate assembly is provided, including a cover plate 110, an inner lead-out member 109 located at an inner side of the cover plate 110, and an outer electrode terminal 112 located at an outer side of the cover plate 110, the inner lead-out member 109 and the outer electrode terminal 112 being electrically connected by using a current interrupt apparatus, the current interrupt apparatus including a score member 101 and a flipping member 102, the flipping member being electrically connected to the outer electrode terminal, the score member being electrically connected to the inner lead-out member, a score 104 being formed on the score member and being electrically connected to the flipping member 102, and the flipping member 102 being capable of acting under an effect of air pressure to break the score 104. After the flipping member 102 breaks the score 104, the electrical connection between the inner lead-out member 109 and the outer electrode terminal 112 is cut off. The inner lead-out member 109 is mounted on the cover plate 110 through a cover plate insulator 122, the cover plate insulator 122 having a first engagement portion 125 engaged with the cover plate 110 and a second engagement portion 126 engaged with the inner lead-out member 109.

In some embodiments, the cover plate insulator 122 includes a substrate 128 attached to a lower surface of the cover plate 110, and a mounting hole 127 configured to mount the current interrupt apparatus is formed on the cover plate 110, the first engagement portion 125 including a first annular protrusion 129 connected to an upper surface of the substrate 128, the first annular protrusion having an L-shaped cross-section, so that the first engagement portion forms, with the substrate 128, an annular slot configured to accommodate a hole wall of the mounting hole 127 through folding outward after passing through the mounting hole.

In some embodiments, the inner lead-out member 109 forms a sheet structure, and the second engagement portion 126 includes a second annular protrusion 130 connected to a lower surface of the substrate 128, the second annular protrusion having an L-shaped cross-section, so that the second engagement portion forms, with the substrate 128, an annular slot configured to accommodate an outer periphery of the inner lead-out member.

In some embodiments, the second engagement portion 126 forms an annular slot, and the inner lead-out member 109 forms a sheet structure, the annular slot formed by the second engagement portion being configured to accommodate the outer periphery of the inner lead-out member 109.

In some embodiments, the sheet structure formed by the inner lead-out member 109 has an intermediate welding region 131 electrically connected to the score member 101 and an edge welding region 132 electrically connected to a core, the edge welding region 132 being located at an outer side of the intermediate welding region 131 to be engaged in the annular slot formed by the second engagement portion.

In some embodiments, the edge welding region 132 has a thickness greater than or equal to a thickness of the intermediate welding region 131.

In some embodiments, the edge welding region 132 forms an annular connection region surrounding the intermediate welding region 131 or a strip-shaped welding region located on two sides of the intermediate welding region 131.

In some embodiments, the score member (101) includes a score region 105 on which the score 104 is formed, a first welding region 103 to be electrically connected to the flipping member 102, and a second welding region 107 to be electrically connected to the inner lead-out member 109, the score region 105 forming an elongated structure extending along a length direction of the cover plate 110, the score 104 extending along a length direction of the elongated structure, and the first welding region and the second welding region being disposed on two sides of the score region 105 along a height direction and respectively forming an elongated structure extending along the length direction of the cover plate, and the intermediate welding region 131 correspondingly forms an elongated structure.

In some embodiments, an accommodating welding groove 133 configured to accommodate the second welding region 107 is formed on the intermediate welding region 131. The present disclosure provides a cell, including a housing 111, a core accommodated in the housing, and the battery cover plate assembly packaging the housing. The inner lead-out member 109 is electrically connected to the core, and the flipping member 102 is in gas communication with inside of the housing.

The present disclosure provides a battery module, the above cell being disposed inside the battery module.

The present disclosure provides a power battery, including a pack body and the above battery module disposed inside the pack body.

The present disclosure provides an electric vehicle, the above power battery being disposed in the electric vehicle.

Five embodiments of the present disclosure are described in detail above with reference to the accompanying drawings, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, the various embodiments of the present disclosure may be combined without departing from the idea of the present disclosure, and such combinations shall also fall within the scope of the present disclosure.

What is claimed is:

1. A battery cover plate assembly, comprising:
a cover plate,
an inner lead-out member located at an inner side of the cover plate,
an outer electrode terminal located at an outer side of the cover plate, and
a current interrupt apparatus,
wherein the inner lead-out member and the outer electrode terminal are electrically connected through the current interrupt apparatus, the current interrupt apparatus comprises the score member and a flipping member, the flipping member is electrically connected to the outer electrode terminal, the score member is electrically connected to the inner lead-out member, a score is formed on the score member and is electrically connected to the flipping member, and the flipping member acts under an effect of air pressure to break the score, and the inner lead-out member is mounted on the cover plate through a cover plate insulator, the cover plate insulator comprises a first engagement portion engaged with the cover plate and a second engagement portion engaged with the inner lead-out member, and
wherein the second engagement portion forms an annular slot and the inner lead-out member forms a sheet structure, the annular slot formed by the second engagement portion is configured to accommodate an outer periphery of the inner lead-out member.

2. The battery cover plate assembly according to claim 1, wherein the cover plate insulator comprises a substrate attached to a lower surface of the cover plate, and a mounting hole configured to mount the current interrupt apparatus is formed on the cover plate, the first engagement portion comprises a first annular protrusion connected to an upper surface of the substrate and having an L-shaped cross-section, the first engagement portion forms, with the substrate, a second annular slot configured to accommodate a hole wall of the mounting hole through folding outward after passing through the mounting hole.

3. The battery cover plate assembly according to claim 2, wherein the inner lead-out member forms the sheet structure, and the second engagement portion comprises a second annular protrusion connected to a lower surface of the substrate and having an L-shaped cross-section, the second engagement portion forms, with the substrate, the annular slot configured to accommodate the outer periphery of the inner lead-out member.

4. The battery cover plate assembly according to claim 1, wherein the sheet structure formed by the inner lead-out member comprises an intermediate welding region electrically connected to the score member and an edge welding region electrically connected to a pole core, the edge welding region is located at an outer side of the intermediate welding region to be engaged in the annular slot formed by the second engagement portion.

5. The battery cover plate assembly according to claim 4, wherein a thickness of the edge welding region is greater than or equal to a thickness of the intermediate welding region.

6. The battery cover plate assembly according to claim 4, wherein the edge welding region forms an annular connection region surrounding the intermediate welding region or a strip-shaped welding region located on two sides of the intermediate welding region.

7. The battery cover plate assembly according to claim 1, wherein the score member comprises a score region on which the score is formed, a first welding region electrically connected to the flipping member, and a second welding region electrically connected to the inner lead-out member, the score region forms an elongated structure extending along a length direction of the cover plate, the score extends along a length direction of the elongated structure, and the first welding region and the second welding region are disposed on two sides of the score region along a height direction of the score region and respectively form an elongated structure extending along the length direction of the cover plate, and the intermediate welding region correspondingly forms an elongated structure.

8. The battery cover plate assembly according to claim 7, wherein an accommodating welding groove configured to accommodate the second welding region is formed on the intermediate welding region.

9. A cell, comprising a housing, a core accommodated in the housing, and a battery cover plate assembly packaging the housing, wherein the battery cover plate assembly is the battery cover plate assembly according to claim 1, the inner lead-out member is electrically connected to the core, and the flipping member is in gas communication with inside of the housing.

10. A battery module, wherein the cell according to claim 9 is disposed inside the battery module.

11. A power battery, comprising a pack body and a battery module disposed inside the pack body, wherein the battery module is the battery module according to claim 10.

12. An electric vehicle, wherein the power battery according to claim 11 is disposed in the electric vehicle.

* * * * *